US012169299B2

(12) United States Patent
Akagawa et al.

(10) Patent No.: US 12,169,299 B2
(45) Date of Patent: Dec. 17, 2024

(54) PLANAR LIGHT SOURCE

(71) Applicant: NICHIA CORPORATION, Anan (JP)

(72) Inventors: Seitaro Akagawa, Komatsushima (JP);
Takuya Nakabayashi, Tokushima (JP);
Masato Okuda, Itano-gun (JP);
Yasunori Shinomiya, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 0 days.

(21) Appl. No.: 18/507,017

(22) Filed: Nov. 10, 2023

(65) Prior Publication Data

US 2024/0159952 A1   May 16, 2024

(30) Foreign Application Priority Data

Nov. 11, 2022  (JP) .................................. 2022-181415

(51) Int. Cl.
F21V 8/00 (2006.01)

(52) U.S. Cl.
CPC .................................. G02B 6/0023 (2013.01)

(58) Field of Classification Search
CPC .................................................. G02B 6/0023
See application file for complete search history.

(56) References Cited

U.S. PATENT DOCUMENTS

| | | | | |
|---|---|---|---|---|
| 7,261,454 | B2* | 8/2007 | Ng ...................... | G02B 19/0028 362/240 |
| 10,910,534 | B2* | 2/2021 | Imada ...................... | H01L 33/62 |
| 11,036,083 | B2* | 6/2021 | Imada ...................... | H01L 33/58 |
| 11,056,615 | B2* | 7/2021 | Kasai ................. | G02F 1/133603 |
| 11,287,105 | B2* | 3/2022 | Nakabayashi ....... | G02B 6/0041 |
| 11,294,223 | B2* | 4/2022 | Hasegawa ............... | G02F 1/137 |
| 2009/0016079 | A1 | 1/2009 | Mizutani | |
| 2011/0149594 | A1 | 6/2011 | Terajima et al. | |
| 2018/0031759 | A1* | 2/2018 | Kong ................... | G02B 6/0068 |
| 2020/0379165 | A1* | 12/2020 | Hayashi ............... | G02B 6/0058 |
| 2021/0341666 | A1* | 11/2021 | Lu ......................... | G02B 6/0021 |

(Continued)

FOREIGN PATENT DOCUMENTS

| | | | |
|---|---|---|---|
| JP | 2006278122 | A | 10/2006 |
| JP | 2008065997 | A | 3/2008 |

(Continued)

*Primary Examiner* — Bryon T Gyllstrom
(74) *Attorney, Agent, or Firm* — Hunton Andrews Kurth LLP (57) ABSTRACT

A planar light source includes a support member; a light guide member including a first surface located proximate to an upper surface of the support member, a second surface opposite to the first surface, and a through hole extending from the first surface to the second surface; a light source unit including a light-emitting element and a wavelength conversion member that covers an upper surface and a lateral surface of the light-emitting element and disposed on the support member at a position of the through hole; a light-transmissive member disposed between the light source unit and the light guide member in the through hole; and a light adjustment member disposed on the light source unit and the light-transmissive member. An upper surface of the wavelength conversion member of the light source unit is located higher than the second surface of the light guide member.

7 Claims, 4 Drawing Sheets

(56) References Cited

U.S. PATENT DOCUMENTS

| | | | |
|---|---|---|---|
| 2021/0382225 A1* | 12/2021 | Kasai | G02B 6/0083 |
| 2022/0075111 A1 | 3/2022 | Yamashita et al. | |
| 2022/0146739 A1* | 5/2022 | Nakabayashi | G02B 6/0051 |

FOREIGN PATENT DOCUMENTS

| | | | |
|---|---|---|---|
| JP | 2011211085 A | 10/2011 |
| JP | 2020198421 A | 12/2020 |
| JP | 2021136119 A | 9/2021 |
| JP | 2022044482 A | 3/2022 |
| JP | 2022075044 A | 5/2022 |

\* cited by examiner

PLANAR LIGHT SOURCE

CROSS-REFERENCE TO RELATED APPLICATION

This application claims priority to Japanese Patent Application No. 2022-181415, filed on Nov. 11, 2022, the disclosure of which is hereby incorporated by reference in its entirety.

TECHNICAL FIELD

An embodiment according to the present disclosure relates to a planar light source.

BACKGROUND

A planar light source in which a light-emitting element such as a light-emitting diode and a light guide member are combined is widely used in, for example, a backlight for a liquid crystal display or the like. For example, Japanese Patent Publication No. 2011-211085 discloses a light-emitting device including a light guide member having a plurality of through holes and a plurality of light sources disposed on a substrate. Each of the plurality of light sources is disposed in the corresponding one of the plurality of through holes of the light guide member.

SUMMARY

An object of an embodiment according to the present disclosure is to provide a planar light source that can reduce brightness unevenness.

According to an aspect of the present disclosure, a planar light source includes a support member; a light guide member including a first surface located proximate to an upper surface of the support member, a second surface opposite to the first surface, and a through hole extending from the first surface to the second surface; a light source unit including a light-emitting element and a wavelength conversion member that covers an upper surface and a lateral surface of the light-emitting element, the light source unit disposed on the support member at a position of the through hole; a light-transmissive member disposed between the light source unit and the light guide member in the through hole; and a light adjustment member disposed on the light source unit and the light-transmissive member. An upper surface of the wavelength conversion member of the light source unit is located higher than the second surface of the light guide member.

According to a planar light source of an embodiment of the present disclosure, brightness unevenness can be reduced.

DETAILED DESCRIPTION

Embodiments are described below with reference to the drawings. The drawings schematically illustrate embodiments, and thus scales, intervals, positional relationships, or the like of members may be exaggerated, or illustration of some of the members may be omitted. In the present description, a direction of an arrow on a Z axis is defined as an upward direction and a direction opposite to the direction of the arrow on the Z axis is defined as a downward direction. A side of an X-axis in a direction of an arrow is defined as a +X side, and an opposite side of the X-axis in the direction of the arrow is defined as a −X side. A side of a Y-axis in a direction of an arrow is defined as a +Y side, and an opposite side of the Y-axis in the direction of the arrow is defined as a −Y side. As a cross-sectional view, an end view illustrating only a cut surface may be illustrated.

In the following description, components having substantially the same function may be denoted by the same reference characters and a description thereof may be omitted. Terms indicating a specific direction or position (for example, "above/upper", "below/lower", and other terms including or related to those terms) may be used. However, these terms are used merely to make it easy to understand relative directions or positions in the referenced drawing. As long as the relative direction or position is the same as that described in the referenced drawing using the term such as "above/upper" or "below/lower", in drawings other than the drawings of the present disclosure, actual products, and the like, components need not be arranged in the same manner as that in the referenced drawing. In the present description, "parallel" includes not only a case in which two straight lines, sides, surfaces, or the like do not intersect even if extended, but also a case in which two straight lines, sides, surfaces, or the like intersect such that an angle formed by the two straight lines, sides, surfaces, or the like is in a range of 10° or less. In the present description, a positional relationship expressed by using the term "on" includes a case in which an object is in direct contact and also a case in which an object is in contact via other object(s).

First Embodiment

Figure 1:
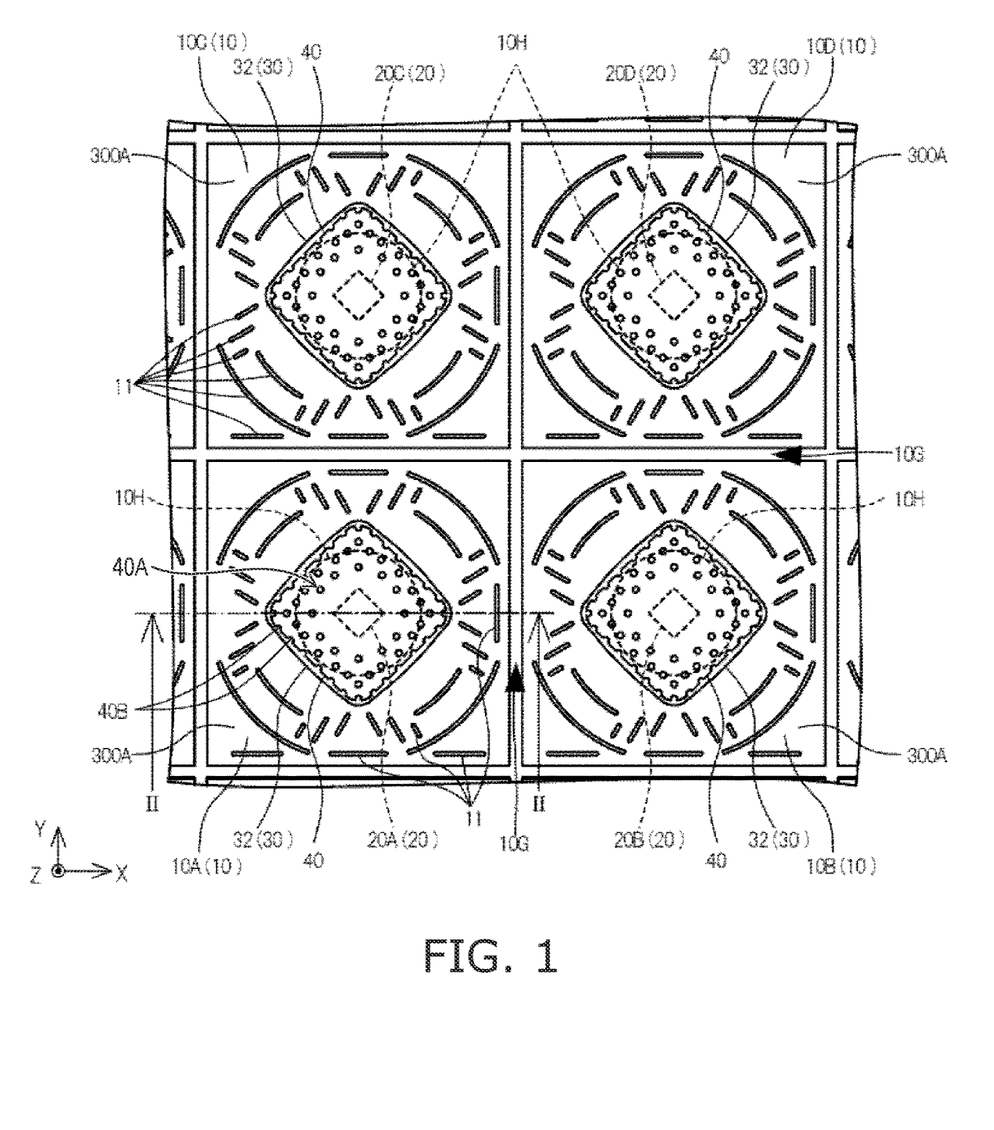
FIG. 1 is a schematic top view of a planar light source according to a first embodiment.

A planar light source 300 of an embodiment is described with reference to FIGS. 1 to 3. FIG. 1 is a schematic diagram of the planar light source 300 viewed from a light-emitting surface side. As illustrated in FIG. 1, two directions that are parallel to the light-emitting surface of the planar light source 300 and are orthogonal to each other are referred to as an X direction and a Y direction. A direction orthogonal to the X direction and the Y direction is referred to as a Z direction. In the present description, a plane parallel to the X direction and the Y direction may be referred to as an XY plane. In the XY plane, the direction inclined from the X direction at an angle in a range from 0° to 360° may be referred to as a lateral direction, and the Z direction may be referred to as a vertical direction.

The planar light source 300 includes a support member 200, a light guide member 10, a light source unit 20, a light-transmissive member 30, and a light adjustment member 40. The light guide member 10 has a first surface 101 located proximate to an upper surface 200A of the support member 200, a second surface 102 opposite to the first surface 101, and a through hole 10H extending from the first surface 101 to the second surface 102. The light source unit 20 includes a light-emitting element 21 and a wavelength conversion member 23 that covers an upper surface and a lateral surface of the light-emitting element 21. The light source unit 20 is disposed in the through hole 10H on the support member 200. The light-transmissive member 30 is disposed between the light source unit 20 and the light guide member 10 in the through hole 10H. The light adjustment member 40 is disposed on the light source unit 20 and the light-transmissive member 30. An upper surface of the wavelength conversion member 23 of the light source unit 20 is located higher than the second surface 102 of the light guide member 10.

The planer light source 300 has a configuration in which the light adjustment member 40 is disposed on the light source unit 20 and the light-transmissive member 30, and the upper surface of the wavelength conversion member 23 of the light source unit 20 is located higher than the second surface 102 of the light guide member 10. Accordingly, light from the light source unit 20 can efficiently enter the light guide member 10 and a region directly above the light source unit 20 can be suppressed from becoming too bright. This can make it possible to reduce brightness unevenness in the planar light source 300.

The elements constituting the planar light source 300 are described below in detail.

Light Guide Member 10

Figure 2:
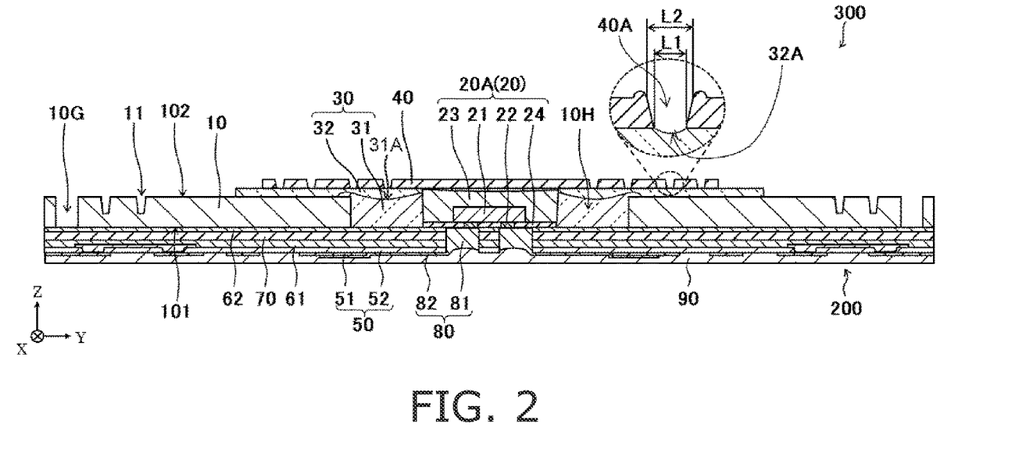
FIG. 2 is a schematic cross-sectional view taken along line II-II in FIG. 1.

As illustrated in FIGS. 1 and 2, the planar light source 300 includes the light guide member 10 having the through hole 10H in which the light source unit 20 is disposed. The light guide member 10 is a member that transmits light emitted by the light source unit 20. A transmittance of the light guide member 10 with respect to a peak wavelength of the light emitted by the light source unit 20 is preferably, for example, 60% or more, more preferably 80% or more.

The light guide member 10 includes the first surface 101 located proximate to the upper surface of the support member 200 and the second surface 102 opposite to the first surface 101. The light guide member 10 continuously surrounds the light source unit 20 in the top view. In the present embodiment, the light guide member 10 has the through hole 10H extending from the first surface 101 to the second surface 102. The light source unit 20 is disposed in the through hole 10H of the light guide member 10. In the present embodiment, the through hole 10H has a circular shape in the top view. In the top view, the through hole 10H may be an ellipse or may have a polygonal shape such as a triangle, a quadrangle, a hexagon, or an octagon.

The number of light guide members 10 included in the planar light source 300 may be one or more. In the example illustrated in FIG. 1, the planar light source 300 includes a plurality of light guide members 10 including a first light guide portion 10A, a second light guide portion 10B, a third light guide portion 10C, and a fourth light guide portion 10D. As illustrated in FIG. 1, in the X direction, the first light guide portion 10A and the second light guide portion 10B are adjacent to each other. In the X direction, the third light guide portion 10C and the fourth light guide portion 10D are adjacent to each other. In the Y direction, the first light guide portion 10A and the third light guide portion 10C are adjacent to each other. In the Y direction, the second light guide portion 10B and the fourth light guide portion 10D are adjacent to each other.

In the present embodiment, each of the light guide members 10 serves as a light-emitting region 300A. Individual light-emitting region 300A can be used as a driving unit for local dimming. The number of light-emitting regions 300A constituting the planar light source 300 is not particularly limited. For example, the planar light source 300 may include only one light-emitting region 300A. Alternatively, a plurality of planar light sources 300 may be arranged to provide a planar light source device having a larger area.

As illustrated in FIG. 1, the plurality of light guide members 10 are preferably disposed with a gap 10G therebetween. With this configuration, a warpage of the support member 200 caused by the difference in thermal expansion coefficient between the light guide member 10 and the support member 200 can be reduced. This can make it possible to reduce the occurrence of cracks in a conductive member of the support member 200. Each of the light guide members 10 are preferably disposed with a gap therebetween.

The light guide member 10 preferably has the recessed portion 11 that opens to the first surface 101 or the second surface 102. With this configuration, the surface area of the light guide member 10 is easily increased. This can make it easy to increase the amount of light extracted from the surface of the light guide member 10 to the outside of the light guide member 10, thereby making it easy to improve the light extraction efficiency of the planar light source 300.

Figure 4A:
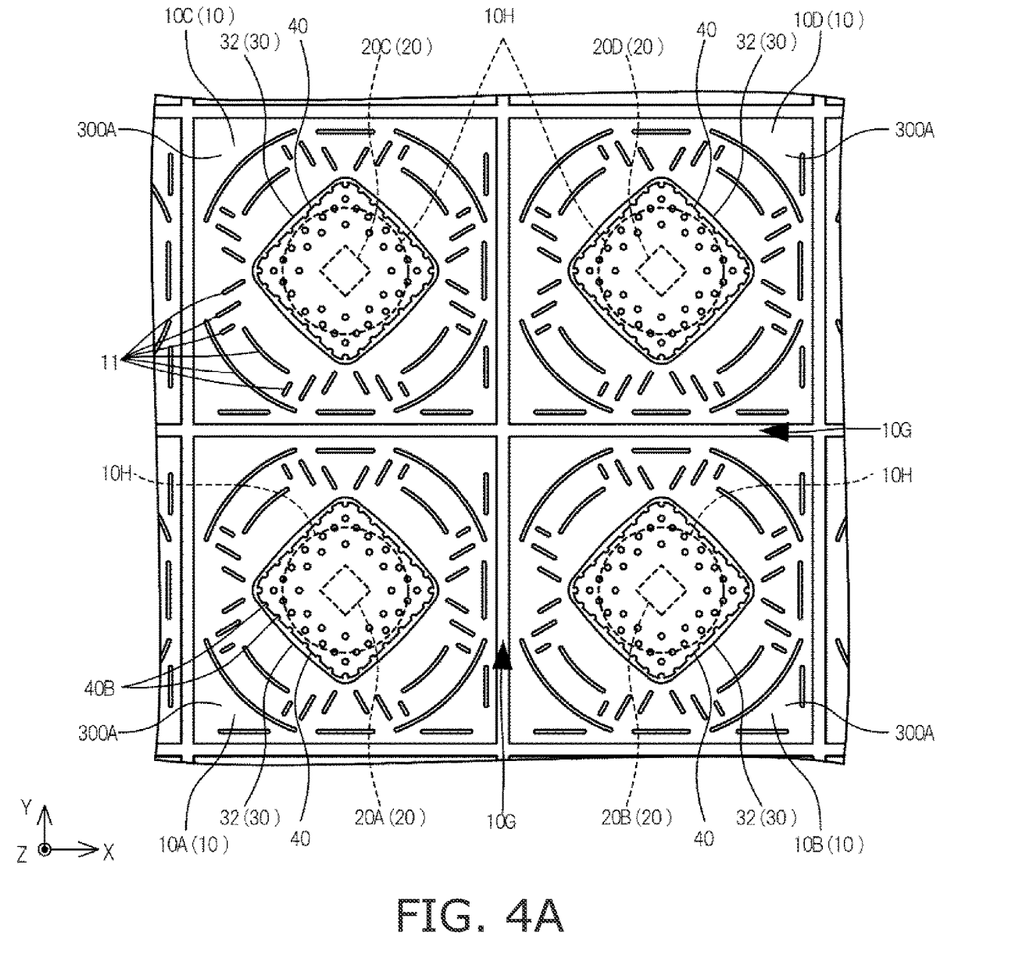
FIG. 4A is a schematic top view illustrating an example of a recessed portion 11 of a light guide member 10.
Figure 4B:
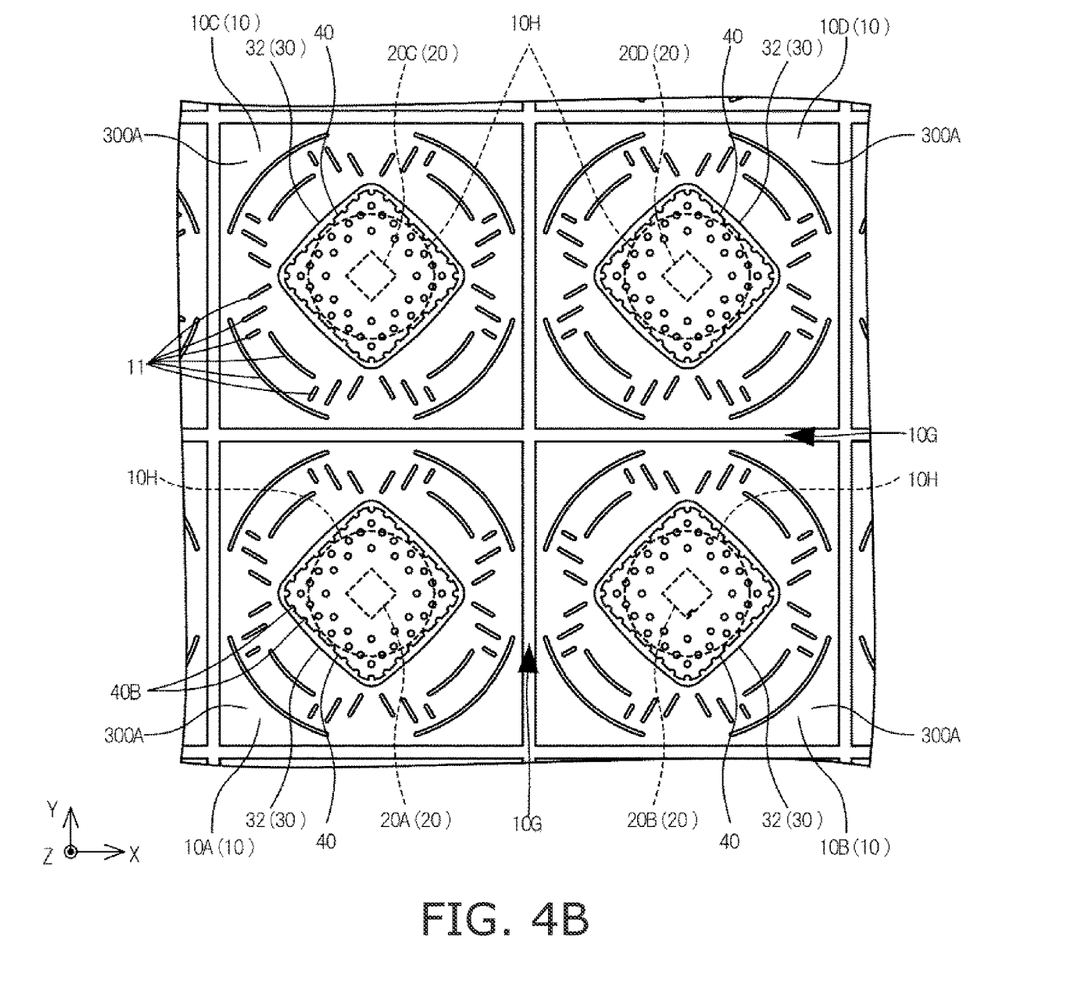
FIG. 4B is a schematic top view illustrating an example of the recessed portion 11 of the light guide member 10.

The shape of the recessed portion 11 of the light guide member 10 is not particularly limited. As illustrated in FIG. 1, the shape of the recessed portion 11 of the light guide member 10 of the present embodiment may include a linear portion. In the example illustrated in FIG. 4A, the recessed portions 11 having a linear shape are in parallel to two sides constituting an outer shape of the light guide member 10. In the example illustrated in FIG. 4B, a recessed portion having a linear shape in parallel to sides constituting the outer shape of the light guide member 10 is not disposed. In the present description, the term linear also includes a straight line, a curved line, a bent line, and the like. For example, in the top view, the shape of the recessed portion 11 of the light guide member 10 may include a portion with a V-shape or an L-shape extending in two directions. In the top view, the shape of the recessed portion 11 of the light guide member 10 may be circular, triangular, quadrangular, hexagonal, octagonal, or the like.

Examples of the material that can be used for the light guide member 10 include a thermoplastic resin such as acrylic, polycarbonate, cyclic polyolefin, polyethylene terephthalate, or polyester, a thermosetting resin such as epoxy or silicone, or glass. The light guide member 10 may contain a phosphor or light-scattering particles.

A thickness of the light guide member 10 is preferably in a range from 150 µm to 800 µm, for example. The light guide member 10 may be constituted by a single layer or may be constituted by a layered body of a plurality of layers, in the vertical direction. When the light guide member 10 is constituted by a layered body, a light-transmissive adhesive may be disposed between layers. The layers of the layered body may use different kinds of main materials.

Light Source Unit 20

The light source unit 20 is disposed in the through hole 10H of the light guide member 10. The number of light source units 20 included in the planar light source 300 may be one or more. In the example illustrated in FIG. 1, the planar light source 300 includes a plurality of light source units 20 including a first light source 20A, a second light source 20B, a third light source 20C, and a fourth light source 20D. The first light source 20A is disposed in the through hole 10H of the first light guide portion 10A. The second light source 20B is disposed in the through hole 10H of the second light guide portion 10B. The third light source 20C is disposed in the through hole 10H of the third light guide portion 10C. The fourth light source 20D is disposed in the through hole 10H of the fourth light guide portion 10D.

Figure 3:
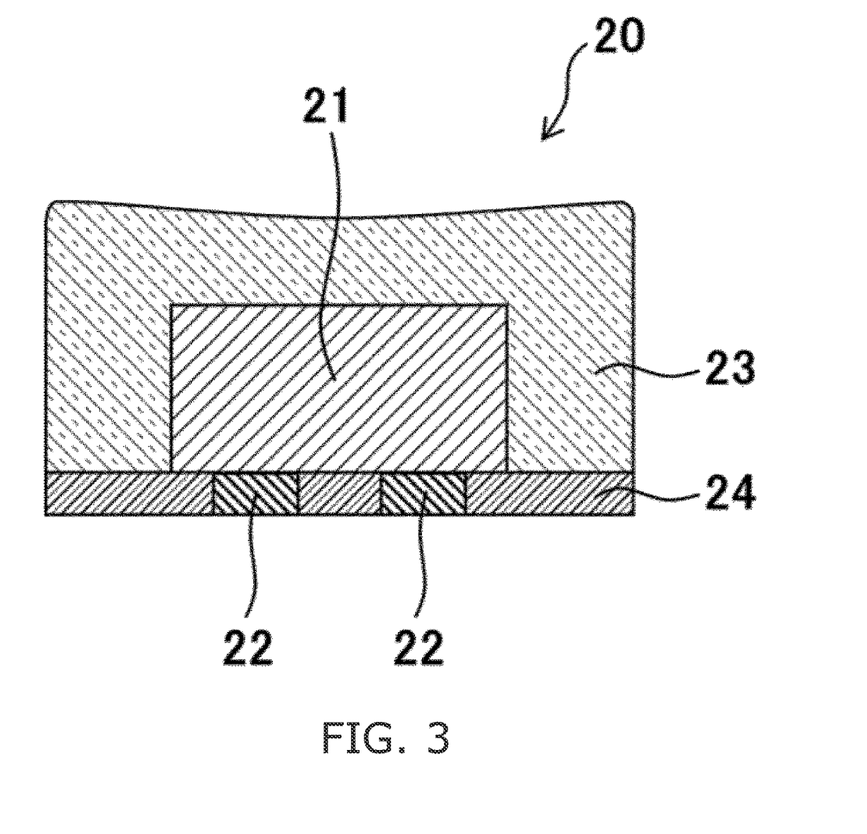
FIG. 3 is a schematic cross-sectional view of a light source unit.

As illustrated in FIG. 3, the light source unit 20 includes a light-emitting element 21. The light-emitting element 21 includes a semiconductor layered body. The semiconductor layered body includes, for example, a substrate of sapphire, gallium nitride, or the like, and an n-type semiconductor layer, a p-type semiconductor layer, and a light-emitting layer interposed between the n-type semiconductor layer and the p-type semiconductor layer, which are disposed on the substrate. The light-emitting element 21 includes an n-side electrode electrically connected to the n-type semiconductor layer, and a p-side electrode electrically connected to the p-type semiconductor layer. The n-side electrode and the p-side electrode form a part of a lower surface of the light-emitting element 21. The light source unit 20 further includes a pair of positive and negative electrodes 22. The pair of positive and negative electrodes 22 form a part of a lower surface of the light source unit 20. One of the pair of electrodes 22 is electrically connected to the p-side electrode, and the other of the pair of electrodes 22 is electrically connected to the n-side electrode. The light source unit 20 need not include the electrodes 22. When the light source unit 20 does not include the pair of positive and negative electrodes 22, the n-side electrode and the p-side electrode of the light-emitting element 21 form a part of the lower surface of the light source unit 20. The light source unit 20 may include no substrate. This can make it easy to downsize the light source unit 20 in a third direction (z direction).

The light source unit 20 illustrated in FIG. 3 includes one light-emitting element 21. Each light source unit 20, that is, the first light source 20A, the second light source 20B, the third light source 20C, and the fourth light source 20D, may include a plurality of light-emitting elements 21. The light emission peak wavelengths of lights emitted by the plurality of light-emitting elements included in each light source unit 20 may be the same as each other or different from each other, in part or in whole.

As illustrated in FIG. 3, the light source unit 20 further includes the wavelength conversion member 23. The wavelength conversion member 23 covers an upper surface and a lateral surface of the light-emitting element 21. For the wavelength conversion member 23, for example, one containing a light-transmissive resin and a phosphor can be used. Examples of the light-transmissive resin that can be used include a silicone resin and an epoxy resin. Examples of the phosphor that can be used include an yttrium aluminum garnet phosphor (for example, $(Y,Gd)_3(Al,Ga)_5O_{12}$:Ce), a lutetium aluminum garnet phosphor (for example, $Lu_3(Al,Ga)_5O_{12}$:Ce), a terbium aluminum garnet phosphor (for example, $Tb_3(Al,Ga)_5O_{12}$:Ce), a CCA phosphor (for example, $Ca_{10}(PO_4)_6Cl_2$:Eu), an SAE phosphor (for example, $Sr_4Al_{14}O_{25}$:Eu), a chlorosilicate phosphor (for example, $Ca_8MgSi_4O_{16}Cl_2$:Eu), a silicate phosphor (for example, $(Ba,Sr,Ca,Mg)_2SiO_4$:Eu), an oxynitride phosphor such as a β-SiAlON phosphor (for example, $(Si,Al)_3(O,N)_4$:Eu) or an α-SiAlON phosphor (for example, $Ca(Si,Al)_{12}(O,N)_{16}$:Eu), a nitride phosphor such as an LSN phosphor (for example, $(La,Y)_3Si_6N_{11}$:Ce), a BSESN phosphor (for example, $(Ba,Sr)_2Si_5N_8$:Eu), an SLA phosphor (for example, $SrLiAl_3N_4$:Eu), a CASN phosphor (for example, $CaAlSiN_3$:Eu) or an SCASN phosphor (for example, $(Sr,Ca)AlSiN_3$:Eu), a fluoride phosphor such as a KSF phosphor (for example, $K_2SiF_6$:Mn), a KSAF phosphor (for example, $K_2(Si_{1-x}Al_x)F_{6-x}$:Mn, where x satisfies 0<x<1), or an MGF phosphor (for example, $3.5MgO·0.5MgF_2·GeO_2$:Mn), a quantum dot having a perovskite structure (for example, $(Cs,FA,MA)(Pb,Sn)(F,Cl,Br,I)_3$, where FA and MA represent formamidinium and methylammonium, respectively), a group II-VI quantum dot (for example, CdSe), a group III-V quantum dot (for example, InP), or a quantum dot having a chalcopyrite structure (for example, $(Ag,Cu)(In,Ga)(S,Se)_2$), and the like. As the phosphor added to the wavelength conversion member 23, one type of a phosphor may be used, or a plurality of types of phosphors may be used.

As illustrated in FIG. 2, the upper surface of the wavelength conversion member 23 of the light source unit 20 is located higher than the second surface 102 of the light guide member 10. Thus, light emitted from the light source unit 20 easily enters the light guide member 10 in the lateral direction, and the light from the light source unit 20 is easily propagated in the lateral direction. A difference in height between the highest portion of the upper surface of the wavelength conversion member 23 and the second surface 102 of the light guide member 10 is preferably in a range from 1 μm to 55 μm, for example. The entire upper surface of the wavelength conversion member 23 may be located higher than the second surface 102 of the light guide member 10, or a part of the upper surface of the wavelength conversion member 23 may be located higher than the second surface 102 of the light guide member 10. The upper surface of the wavelength conversion member 23 may be a flat surface, a curved surface, or a surface including a step or the like. When the upper surface of the wavelength conversion member 23 is a flat surface, the entire upper surface of the wavelength conversion member 23 is located higher than the second surface 102 of the light guide member 10. When the upper surface of the wavelength conversion member 23 is a curved surface or a surface including a step or the like, a difference in height between the highest portion of the upper surface of the wavelength conversion member 23 and the lowest portion of the upper surface of the wavelength conversion member 23 is preferably in a range from 0.1 μm to 50 μm, for example.

When the entire upper surface of the wavelength conversion member 23 is a curved surface, the wavelength conversion member 23 can be disposed such that a part of the curved upper surface is located higher than the second surface 102 of the light guide member 10. In this case, an outer peripheral portion of the upper surface of the wavelength conversion member 23 is preferably located higher than the second surface 102 of the light guide member 10. With this configuration, the area of the lateral surface of the wavelength conversion member 23 can be increased, so that the amount of light emitted from the lateral surface of the light source unit 20 toward the light guide member 10 can be increased. Furthermore, the surface area of the upper surface of the wavelength conversion member 23 can be increased, so that the light extraction efficiency can be improved. When the upper surface of the wavelength conversion member 23 has a shape such as a polygon having a plurality of corners, the corners of the upper surface of the wavelength conversion member 23 may be located higher than the second surface 102 of the light guide member 10. With this configuration, the light extraction efficiency can be improved, and light traveling between the upper surface of the wavelength conversion member 23 and the light adjustment member 40 can be propagated in the lateral direction from the outer peripheral portion of the upper surface of the wavelength conversion member 23 other than the corners of the upper surface of the wavelength conversion member 23.

In the top view, the upper surface of the wavelength conversion member 23 has, for example, a substantially rectangular shape with four corners. The four corners of the upper surface of the wavelength conversion member 23 are preferably located higher than the central portion of the upper surface of the wavelength conversion member 23. With this configuration, the area of the lateral surface of the wavelength conversion member 23 can be increased, so that the amount of light emitted from the lateral surface of the light source unit 20 toward the light guide member 10 can be increased. Furthermore, the surface area of the upper surface of the wavelength conversion member 23 can be increased, so that the light extraction efficiency can be improved.

The upper surface of the wavelength conversion member 23 preferably has a curved surface with the central portion being recessed downward. Thus, light propagating between the upper surface of the wavelength conversion member 23 and the light adjustment member 40 is reflected by the curved surface of the wavelength conversion member 23, so that light traveling in the lateral direction can be increased, and the light extraction efficiency can be improved.

Such a light source unit 20 having the wavelength conversion member 23 in which a part of the upper surface is located higher than the other portion may be obtained by providing a light source unit 20 originally having such a structure or by providing a light source unit 20 having a flat upper surface and removing a part of the upper surface. Alternatively, after the light source unit 20 having a flat upper surface is provided and disposed in the through hole 10H, a resin of the light-transmissive member 30 disposed in the through hole 10H may be allowed to infiltrate into the wavelength conversion member 23 to swell the wavelength conversion member 23, thereby forming the wavelength conversion member 23 having a part of the upper surface located higher than the other parts.

In the top view, the shape of the wavelength conversion member 23 is not particularly limited. In the top view, the shape of the wavelength conversion member 23 may be, for example, triangular, quadrangular, hexagonal, octagonal, or the like. When the shape of the wavelength conversion member 23 in the top view is quadrangular, sides constituting the outer shape of the wavelength conversion member 23 are preferably inclined with respect to sides constituting the outer shape of the light guide member 10. In the example illustrated in FIG. 1, the sides constituting the outer shape of the wavelength conversion member 23 are inclined at 45° with respect to the sides constituting the outer shape of the light guide member 10.

The brightness of light emitted in a direction perpendicular to the sides constituting the outer shape of the wavelength conversion member 23 in the top view tends to be higher than the brightness of light emitted in a diagonal direction of the wavelength conversion member 23. In the light guide member 10 having a quadrangular outer shape in the top view, light tends to be difficult to be spread to the four corners of the second surface 102. When the wavelength conversion member 23 has a quadrangular shape in the top view, light emitted from the wavelength conversion member 23 can be easily spread to the four corners of the light guide member 10 by disposing the light source unit 20 with respect to the light guide member 10 such that a diagonal line connecting the corners of the second surface 102 and the sides constituting the outer shape of the wavelength conversion member 23 intersect with each other and the sides constituting the outer shape of the wavelength conversion member 23 face the corners of the light guide member 10. This can reduce brightness unevenness in the light-emitting region 300A.

The light source unit 20 can further include a covering member 24. The covering member 24 is disposed on the lower surface of the light-emitting element 21. The covering member 24 is disposed so that a lower surface of the electrodes 22 of the light source unit 20 is exposed from the covering member 24. The covering member 24 is also disposed on a lower surface of the wavelength conversion member 23 covering the lateral surface of the light-emitting element 21.

The covering member 24 has reflectivity to light emitted by the light-emitting element 21. The covering member 24 can be formed of, for example, a resin member containing light-scattering particles. Examples of the resin member of the covering member 24 that can be used include a thermoplastic resin such as an acrylic resin, a polycarbonate resin, a cyclic polyolefin resin, a polyethylene terephthalate resin, or a polyester resin, or a thermosetting resin such as an epoxy resin or a silicone resin. Examples of the light-scattering particles of the covering member 24 that can be used include particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like.

Light-Transmissive Member 30

The light-transmissive member 30 is a member that transmits light emitted by the light source unit 20. The light-transmissive member 30 includes a first light-transmissive portion 31 and a second light-transmissive portion 32. In the example illustrated in FIG. 2, the first light-transmissive portion 31 and the second light-transmissive portion 32 are individual bodies. The first light-transmissive portion 31 and the second light-transmissive portion 32 may be integrally formed of the same material. A transmittance of each of the first light-transmissive portion 31 and the second light-transmissive portion 32 with respect to the peak wavelength of light emitted by the light source unit 20 is preferably, for example, 60% or more, more preferably 80% or more.

As illustrated in FIG. 2, the first light-transmissive portion 31 is preferably in contact with the lateral surface of the light source unit 20. With this configuration, the light from the light source unit 20 is likely to enter the first light-transmissive portion 31. The first light-transmissive portion 31 is preferably in contact with the light guide member 10. With this configuration, the light from the light source unit 20 is likely to enter the light guide member 10. At least a part of the upper surface of the light source unit 20 is preferably exposed from the first light-transmissive portion 31 With this configuration, it becomes easier to downsize the planar light source 300 in the third direction (Z direction) than when the first light-transmissive portion 31 covers the entire upper surface of the light source unit 20. The entire upper surface of the light source unit 20 may be exposed from the first light-transmissive portion 31. The first light-transmissive portion 31 may cover the entire upper surface of the light source unit 20. The first light-transmissive portion 31 covering the entire upper surface of the light source unit 20 can facilitate the adjustment of brightness in a region directly above the light source unit 20. For example, by changing the thickness of a portion of the first light-transmissive portion 31 covering the upper surface of the light source unit 20, the brightness in the region directly above the light source unit 20 can be adjusted. This can make it easy to adjust brightness, so that it becomes easy to reduce brightness unevenness in the planar light source 300. When the first light-transmissive portion 31 covers the upper surface of the light source unit 20, the second light-transmissive portion 32 covers the upper surface of the light source unit 20 via the first light-transmissive portion 31. The first light-transmissive portion 31 can extend on the second surface 102 of the light guide member 10. With this configuration, the brightness of the second surface 102 of the light guide member 10 in the vicinity of the through hole 10H can be adjusted.

The first light-transmissive portion 31 may be constituted by a single layer or may be constituted by a layered body of a plurality of layers in the third direction (Z direction). The first light-transmissive portion 31 may contain a phosphor or light-scattering particles. When the first light-transmissive portion 31 is a layered body, the layers may or may not contain a phosphor and/or light-scattering particles. For example, the first light-transmissive portion 31 may be constituted by a layer containing a phosphor and a layer containing no phosphor. For example, a material the same as or similar to that of the resin member of the covering member 24 can be used as the material of the first light-transmissive portion 31.

The second light-transmissive portion 32 is disposed above the first light-transmissive portion 31. The second light-transmissive portion 32 may further be disposed above the light source unit 20. The second light-transmissive portion 32 is preferably in contact with the upper surface of the light source unit 20 and/or an upper surface of the first light-transmissive portion 31. In the example illustrated in FIG. 2, the second light-transmissive portion 32 is in contact with the upper surface of the light source unit 20. When the first light-transmissive portion 31 covers the upper surface of the light source unit 20, the second light-transmissive portion 32 may be in contact with the upper surface of the first light-transmissive portion 31 disposed above the light source unit 20.

The second light-transmissive portion 32 preferably extends on the second surface 102 of the light guide member 10. This can adjust the brightness of the second surface 102 of the light guide member 10 in the vicinity of the through hole 10H. The light adjustment member 40 is preferably disposed on a portion of the second light-transmissive portion 32 located on the second surface 102 of the light guide member 10. This can suppress a region above the second surface 102 of the light guide member 10 in the vicinity of the through hole 10H from being too bright.

For example, a material the same as or similar to that of the resin member of the covering member 24 can be used as the material of the second light-transmissive portion 32. Examples of the second light-transmissive portion 32 that may be used include an optically clear adhesive (OCA) having a sheet shape. The second light-transmissive portion 32 may contain a phosphor or light-scattering particles.

As illustrated in FIG. 2, the second light-transmissive portion 32 has a recessed portion 32A (hereinafter, referred to as a second light-transmissive recessed portion). Because the second light-transmissive portion 32 has the second light-transmissive recessed portion 32A, the surface area of the second light-transmissive portion 32 can be increased. This can increase the amount of light extracted to the outside from the second light-transmissive portion 32.

The second light-transmissive recessed portion 32A is preferably connected to a through hole 40A of the light adjustment member 40 (hereinafter, referred to as a light adjustment through hole). In the example illustrated in FIG. 2, a space inside the second light-transmissive recessed portion 32A and a space inside the light adjustment through hole 40A are connected to each other. With this configuration, light exiting the second light-transmissive recessed portion 32A can be suppressed from being blocked by the light adjustment member 40. That is, the light exiting the second light-transmissive recessed portion 32A passes through the light adjustment through hole 40A and is extracted to the outside of the planar light source 300. This can improve the light extraction efficiency of the planar light source 300. In the top view, the second light-transmissive recessed portion 32A overlaps the light adjustment through hole 40A.

As illustrated in FIG. 2, in the cross-sectional view, a maximum length L1 of the second light-transmissive recessed portion 32A in the lateral direction is preferably shorter than a maximum length L2 of the light adjustment through hole 40A in the lateral direction. In other words, the maximum length L2 of the light adjustment through hole 40A in the lateral direction is preferably longer than the maximum length L1 of the second light-transmissive recessed portion 32A in the lateral direction. With this configuration, light emitted from the second light-transmissive recessed portion 32A can be suppressed from being blocked by the light adjustment member 40.

At least a part of the second light-transmissive recessed portion 32A is located below a lower surface of the light adjustment member 40. With this configuration, a distance from the second light-transmissive recessed portion 32A to the light source unit 20 in the third direction (Z direction) can be short. Thus, in the present embodiment with an effect in which the amount of light from the light source unit 20 that is extracted to the outside of the planar light source 300 through the second light-transmissive recessed portion 32A is easily increased, the wavelength conversion member 23 of the light source unit 20 is located higher than the second surface 102 of the light guide member 10, so that the distance from the second light-transmissive recessed portion 32A to the light source unit 20 in the third direction (Z direction) is easily reduced and thus this effect can be clearer.

The first light-transmissive portion 31 can have a recessed portion 31A (hereinafter, referred to as a first light-transmissive recessed portion 31A). As illustrated in FIG. 2, the first light-transmissive recessed portion 31A is located around the light source unit 20 in the lateral direction. With this configuration, light traveling in the lateral direction from the light source unit 20 is easily extracted to the outside of the planar light source 300 through the first light-transmissive recessed portion 31A. The depth of the first light-transmissive recessed portion 31A is preferably different from the depth of the second light-transmissive recessed portion 32A. When the first light-transmissive recessed portion 31A and the second light-transmissive recessed portion 32A are defined by curved surfaces, the respective curved surfaces preferably have different curvatures. For example, the curvature of the curved surface defining the first light-transmissive recessed portion 31A is smaller than the curvature of the curved surface defining the second light-transmissive recessed portion 32A. Accordingly, light from the light source unit 20 is reflected at different angles in the first light-transmissive recessed portion 31A and the second light-transmissive recessed portion 32A, and thus the light extraction efficiency can be improved.

The depth of the second light-transmissive recessed portion 32A is preferably shallower than the depth of the first light-transmissive recessed portion 31A. This can make it easy for light from the light source unit 20 to spread in the lateral direction in the second light-transmissive portion 32.

Light Adjustment Member 40

The light adjustment member 40 has reflectivity and light translucency to light emitted by the light source unit 20. A part of the light emitted from the light source unit 20 is reflected by the light adjustment member 40, and the other part thereof is transmitted through the light adjustment member 40. The transmittance of the light adjustment member 40 with respect to the peak wavelength of light emitted by the light source unit 20 is lower than the transmittance of each of the first light-transmissive portion 31 and the second light-transmissive portion 32 with respect to the peak wavelength of the light emitted by the light source unit 20. For example, the transmittance of the light adjustment member 40 with respect to the peak wavelength of the light emitted by the light source unit 20 is preferably in a range from 1% to 50%, more preferably in a range from 3% to 30%, for example. The light adjustment member 40 may be constituted by a single layer or may be constituted by a layered body of a plurality of layers.

The light adjustment member 40 is disposed above the light source unit 20. The light adjustment member 40 and the light source unit 20 overlap each other in a plan view, and a portion of the light adjustment member 40 is located above the light source unit 20 in the overlapping portion. The light adjustment member 40 is located above the light source unit 20, so that a region directly above the light source unit 20 can be suppressed from becoming too bright.

The light adjustment member 40 is disposed above the light-transmissive member 30. The light adjustment member 40 and the first light-transmissive portion 31 overlap each other in the plan view, and a portion of the light adjustment member 40 is located above the first light-transmissive portion 31 in the overlapping portion. The light adjustment member 40 is located above the first light-transmissive portion 31, so that a region directly above the first light-transmissive portion 31 can be suppressed from becoming too bright.

The light adjustment member 40 is disposed above the second light-transmissive portion 32. The light adjustment member 40 and the second light-transmissive portion 32 overlap each other in the plan view, and a portion of the light adjustment member 40 is located above the second light-transmissive portion 32 in the overlapping portion. The light adjustment member 40 is located above the second light-transmissive portion 32, so that a region directly above the second light-transmissive portion 32 can be suppressed from becoming too bright. The light adjustment member 40 is preferably disposed above the second light-transmissive portion 32 in a portion where the first light-transmissive portion 31 and the second light-transmissive portion 32 overlap each other in the plan view. Thus, the region directly above a portion of the second light-transmissive portion 32 located above the first light-transmissive portion 31 from which light from the lateral surface of the light source unit 20 is easily extracted can be suppressed from becoming too bright.

The light adjustment member 40 may or may not have the light adjustment through hole 40A. The light adjustment member 40 having the light adjustment through hole 40A can facilitate adjustment of brightness in a region directly above the light adjustment member 40. For example, by changing the size and position of the light adjustment through hole 40A, light from the light source unit 20 blocked by the light adjustment member 40 can be adjusted. This can facilitate adjustment of the brightness in the region directly above the light adjustment member 40, thereby making it easy to reduce brightness unevenness in the planar light source 300.

The light adjustment through hole 40A of the light adjustment member 40 is preferably located apart from the light source unit 20 in the top view. With this configuration, a region directly above the light source unit 20 can be suppressed from becoming too bright.

In the top view, the shape of the light adjustment through hole 40A is not particularly limited. As illustrated in FIG. 1, the shape of the light adjustment through hole 40A in a plan view is circular. In the top view, the shape of the light adjustment through hole 40A may be an ellipse or a polygon such as a triangle, a quadrangle, a hexagon, or an octagon. In the top view, the shape of the light adjustment through hole 40A may include a linear portion.

In the top view, a plurality of light adjustment through holes 40A preferably surround the light source unit 20. With this configuration, the brightness of the planar light source 300 in the X direction and/or the Y direction is easily adjusted.

As illustrated in FIG. 1, in the top view, the light adjustment member 40 preferably includes a plurality of recessed portions 40B (hereinafter, referred to as light adjustment recessed portions) recessed in the lateral direction. The light adjustment recessed portions 40B are provided on an outer edge of the light adjustment member 40. The light adjustment member 40 having the light adjustment recessed portions 40B can facilitate adjustment of brightness around the light adjustment member 40. For example, by changing the size and position of the light adjustment recessed portion 40B, light from the light source unit 20 blocked by the light adjustment member 40 can be adjusted. This can easily adjust the brightness around the light adjustment member 40, thereby making it easy to reduce brightness unevenness in the planar light source 300. The size of the light adjustment recessed portion 40B is not particularly limited. A maximum length of the light adjustment recessed portion 40B in the X direction may be shorter than a maximum length of the light adjustment through hole 40A in the X direction. A maximum length of the light adjustment recessed portion 40B in the Y direction may be shorter than a maximum length of the light adjustment through hole 40A in the Y direction.

The light adjustment member 40 can be formed of a resin member and a reflector contained in the resin member. For example, a material the same as or similar to that of the resin member of the covering member 24 can be used as the resin member of the light adjustment member 40. A material the same as or similar to that of the light-scattering particles of the covering member 24 can be used as the material of the reflector of the light adjustment member 40. A gas such as nitrogen or oxygen may be used as the reflector of the light adjustment member 40. The light adjustment member 40 may contain both light-scattering particles and a gas as reflectors.

Support Member 200

The support member 200 supports the light source unit 20 and the light guide member 10. The light guide member 10 is disposed on the support member 200 with the first surface 101 facing the upper surface of the support member 200.

The support member 200 includes a wiring substrate 50. The wiring substrate 50 includes an insulating base body 51, and at least one wiring layer 52 disposed on at least one surface of the insulating base body 51. The insulating base body 51 may be a rigid substrate or may be a flexible substrate. The insulating base body 51 is preferably a flexible substrate in order to reduce the thickness of the planar light source. The insulating base body 51 may be constituted by a single layer or may be constituted by a layered body of a plurality of layers in the third direction (Z direction). For example, the insulating base body 51 may be constituted by a single-layer flexible substrate or may be constituted by a layered body of a plurality of rigid substrates. An example of a material of the insulating base body 51 includes a resin such as a polyimide. The wiring layer 52 is a metal film, for example, a copper film.

The support member 200 may further include a first adhesive layer 61 disposed on the wiring substrate 50, a reflective member 70 disposed on the first adhesive layer 61, and a second adhesive layer 62 disposed on the reflective member 70.

The first adhesive layer 61 is disposed between the wiring substrate 50 and the reflective member 70 and bonds the wiring substrate 50 and the reflective member 70. The first adhesive layer 61, for example, can be formed of a resin member containing light-scattering particles. For example, a material the same as or similar to that of the resin member of the covering member 24 can be used as the resin member of the first adhesive layer 61. For example, a material the same as or similar to that of the light-scattering particles of the covering member 24 can be used as the light-scattering particles of the first adhesive layer 61. Examples of the first adhesive layer 61 include an optically clear adhesive having a sheet shape.

The refractive index of the resin member of the first adhesive layer 61 is preferably lower than the refractive index of the resin member of the reflective member 70. With this configuration, a part of light traveling from the reflective member 70 to the first adhesive layer 61 tends to be totally reflected at an interface between the reflective member 70 and the first adhesive layer 61. This can reduce light escaping below the first adhesive layer 61, and thus the light extraction efficiency of the planar light source 300 is improved.

The reflective member 70 is disposed below the light guide member 10, below the light source unit 20, and below the light-transmissive member 30. The reflective member 70 has reflectivity to light emitted by the light source unit 20. The reflective member 70 can be formed of a resin member and a reflector contained in the resin member. For example, a material the same as or similar to that of the resin member of the covering member 24 can be used as the resin member of the reflective member 70. A material the same as or similar to that of the light-scattering particles of the covering member 24 can be used as the material of the reflector of the reflective member 70. A gas such as nitrogen or oxygen may be used as the reflector of the reflective member 70. The reflective member 70 may contain both light-scattering particles and a gas as reflectors.

The refractive index of the reflector of the reflective member 70 is preferably lower than the refractive index of the resin member of the reflective member 70. With this configuration, a part of light from the light source unit 20 entered the reflective member 70 tends to be totally reflected at an interface between the resin member of the reflective member 70 and the reflector of the reflective member 70. This can reduce light escaping below the reflective member 70, and thus the light extraction efficiency of the planar light source 300 is improved.

When the refractive index of the reflector of the reflective member 70 is lower than the refractive index of the resin member of the reflective member 70, the refractive index of the resin member of the reflective member 70 is preferably higher than the refractive index of a base material of the light guide member 10. With this configuration, it becomes easy to increase the difference in refractive index between the resin member of the reflective member 70 and the reflector of the reflective member 70. Thus, a part of light from the light source unit 20 entered the reflective member 70 tends to be totally reflected at the interface between the resin member of the reflective member 70 and the reflector of the reflective member 70.

The second adhesive layer 62 is disposed between the reflective member 70 and the first surface 101 of the light guide member 10 and bonds the reflective member 70 and the light guide member 10. The light source unit 20 is disposed on the second adhesive layer 62 in the through hole 10H of the light guide member 10. The second adhesive layer 62, for example, can be formed of a resin member containing light-scattering particles. For example, a material the same as or similar to that of the resin member of the covering member 24 can be used as the resin member of the second adhesive layer 62. For example, a material the same as or similar to that of the light-scattering particles of the covering member 24 can be used as the light-scattering particles of the second adhesive layer 62. Examples of the second adhesive layer 62 include an optically clear adhesive having a sheet shape.

The refractive index of the resin member of the second adhesive layer 62 is preferably lower than the refractive index of the base material of the light guide member 10. With this configuration, a part of light traveling from the light guide member 10 to the second adhesive layer 62 tends to be totally reflected at an interface between the light guide member 10 and the second adhesive layer 62. This can reduce light escaping below the second adhesive layer 62, and thus the light extraction efficiency of the planar light source 300 is improved. The refractive index of the resin member of the second adhesive layer 62 is preferably lower than the refractive index of a base material of the first light-transmissive portion 31. With this configuration, a part of light traveling from the first light-transmissive portion 31 to the second adhesive layer 62 tends to be totally reflected at an interface between the first light-transmissive portion 31 and the second adhesive layer 62. This can reduce light escaping below the second adhesive layer 62, and thus the light extraction efficiency of the planar light source 300 is improved.

The support member 200 further includes a conductive member 80. The conductive member 80 includes, for example, a resin and metal particles contained in the resin. Examples of the resin of the conductive member 80 include an epoxy resin and a phenol resin. Examples of the metal particles include copper particles and silver particles.

The conductive member 80 includes a connecting portion 81 and a wiring portion 82. The connecting portion 81 penetrates the second adhesive layer 62, the reflective member 70, the first adhesive layer 61, and the insulating base body 51 in the vertical direction. The wiring portion 82 is disposed on a surface of the wiring substrate 50 on which the wiring layer 52 is disposed and is connected to the connecting portion 81. The connecting portion 81 and the wiring portion 82 can be integrally formed of the same material. A part of the wiring portion 82 is connected to the wiring layer 52.

A pair of conductive members 80 are disposed apart from each other corresponding to the pair of positive and negative electrodes 22 of the light source unit 20. The connecting portion 81 of one of the conductive members 80 is connected to the positive electrode 22 below the light source unit 20, and the connecting portion 81 of the other conductive member 80 is connected to the negative electrode 22 below the light source unit 20. The electrodes 22 of the light source unit 20 are electrically connected to the conductive members 80 and the wiring layer 52.

The support member 200 further includes an insulating layer 90. The insulating layer 90 is disposed on a lower surface of the wiring substrate 50 and covers the wiring layer 52. Examples of the material of the insulating layer 90 include an epoxy resin, a urethane resin, and an acrylic resin.

What is claimed is:

1. A planar light source comprising:
   a support member;
   a light guide member comprising a first surface located proximate to an upper surface of the support member, a second surface opposite to the first surface, and a through hole extending from the first surface to the second surface;
   a light source unit comprising a light-emitting element and a wavelength conversion member that covers an upper surface and a lateral surface of the light-emitting element, the light source unit disposed on the support member in the through hole;
   a light-transmissive member disposed between the light source unit and the light guide member in the through hole; and
   a light adjustment member disposed on the light source unit and the light-transmissive member,
   wherein the second surface of the light guide member is located higher than the first surface of the light guide member, and
   wherein an upper surface of the wavelength conversion member of the light source unit is located higher than the second surface of the light guide member.

2. The planar light source according to claim 1, wherein, in a top view, the upper surface of the wavelength conversion member has a substantially rectangular shape with a plurality of corners, and
   at least one of the plurality of corners of the upper surface of the wavelength conversion member is located higher than a central portion of the upper surface of the wavelength conversion member.

3. The planar light source according to claim 2, wherein the upper surface of the wavelength conversion member includes a curved surface with the central portion being recessed downward.

4. The planar light source according to claim 1, wherein the light-transmissive member is disposed on the wavelength conversion member.

5. The planar light source according to claim 1, wherein the light-transmissive member extends on the second surface of the light guide member, and
   at least one portion of the light adjustment member is disposed on the light-transmissive member located on the second surface of the light guide member.

6. The planar light source according to claim 2, wherein, in a plan view, an outer shape of the light guide member is quadrangular, and a side constituting an outer shape of the wavelength conversion member is inclined with respect to a side constituting the outer shape of the light guide member.

7. The planar light source according to claim 2, wherein, in the plan view, the outer shape of the light guide member is substantially rectangular.

\* \* \* \* \*